Figure 1:
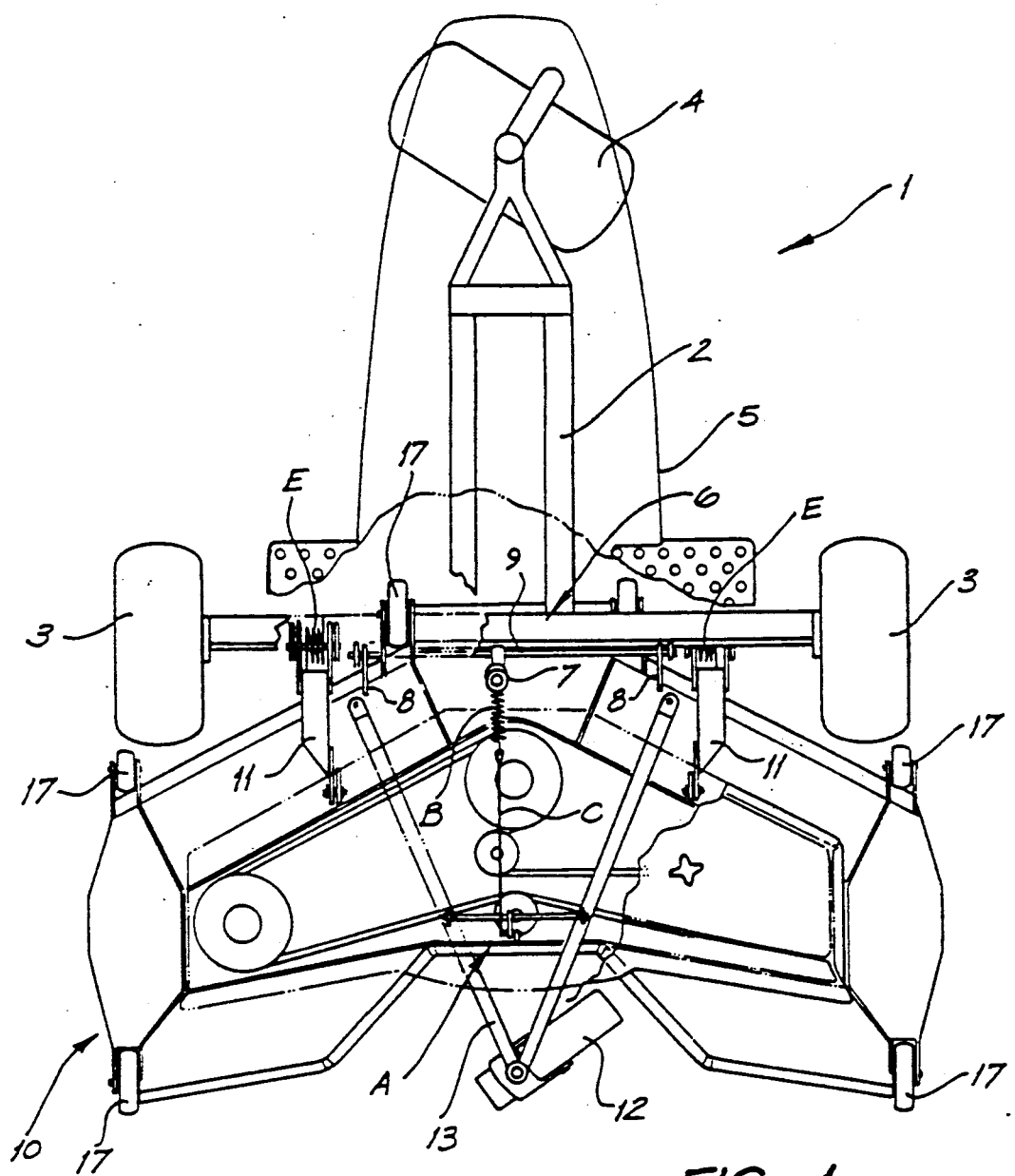

United States Patent [19]
Nicol

[11] Patent Number: 5,079,926
[45] Date of Patent: Jan. 14, 1992

[54] APPARATUS FOR VARYING HEIGHT OF CUTTING HEAD

[76] Inventor: Alexander N. Nicol, 102-104 Dampier Street, Barellan Point, Queensland 4306, Australia

[21] Appl. No.: 578,837

[22] Filed: Sep. 7, 1990

[30] Foreign Application Priority Data

Sep. 7, 1989 [AU] Australia .................. PJ6208

[51] Int. Cl.⁵ .............. A01D 75/18; A01D 34/00; E01C 23/08
[52] U.S. Cl. .................. 56/12.7; 56/10.4; 56/15.5; 404/91
[58] Field of Search ............ 56/17.2, 17.1, 10.4, 56/12.7, 15.5, 13.5, 153; 299/38, 39; 404/90, 91, 92

[56] References Cited

U.S. PATENT DOCUMENTS

| | | | |
|---|---|---|---|
| 2,596,641 | 5/1952 | Bert et al. | 56/25 |
| 2,859,578 | 11/1958 | Hall | 56/24.5 |
| 3,512,344 | 5/1970 | Kortum | 56/25.4 |
| 3,702,051 | 11/1972 | Deines | 56/11.3 |
| 3,845,609 | 11/1974 | Whitley | 56/27.5 |
| 3,874,150 | 4/1975 | Boeck | 56/17.1 |
| 4,120,136 | 10/1978 | Rose | 56/17.1 |
| 4,205,439 | 6/1980 | Sweet | 56/12.7 |
| 4,310,997 | 1/1982 | Streicher | 56/15.9 |
| 4,490,966 | 1/1985 | Kuhn et al. | 56/15.9 |
| 4,525,988 | 7/1985 | Harlan | 56/16.8 |
| 4,760,686 | 8/1988 | Samejima et al. | 56/15.8 |
| 4,760,687 | 8/1988 | Siegrist | 56/15.8 |
| 4,762,371 | 8/1988 | Lupton | 299/39 |
| 4,779,406 | 10/1988 | Schroeder | 56/15.9 |
| 4,829,754 | 5/1989 | Shimamura et al. | 56/15.9 |

FOREIGN PATENT DOCUMENTS

| | | |
|---|---|---|
| 61017 | 5/1975 | Australia . |
| 67982 | 8/1987 | Australia . |
| 81976 | 6/1988 | Australia . |

Primary Examiner—Ramon S. Britts
Assistant Examiner—Nancy P. Connolly
Attorney, Agent, or Firm—Cushman, Darby & Cushman

[57] ABSTRACT

Apparatus for varying the height of a cutter head on a motor mower vehicle, whereby the cutter head has ground contact wheels and is attached to the motor mower vehicle. The apparatus includes a flexible linkage member which is also able to be extended, thereby enabling the cutter head to follow the contours of the ground being traversed. The cutter head is also able to be pivoted to the vertical position about a pivotal joint between the cutter head and the motor mower vehicle.

7 Claims, 5 Drawing Sheets

APPARATUS FOR VARYING HEIGHT OF CUTTING HEAD

The present invention relates to motor mowers, and in particular, to a system of linkages and springs which automatically regulate and limit the loads applied to and provide protection for controls and associated mechanisms used to manipulate and operate a motor mower cutter head.

"Ride-On" motor mowers of the type where the cutter head is an attachment to either the front, rear or side of the tractor chassis have preferably functions which allow for a quick action incremental adjustment of the cutting height, a fully floating, terrain following, non-scalping cutter head and a "lift-up" to vertical attitude of the cutter head for ease of maintenance features.

It is an object of the present invention to provide a system of linkages and springs which provide the means to manipulate the cutter head to perform the abovementioned major features as well as allowing these features to interact with each other simultaneously or individually.

It is another object of the present invention to prevent any one or more functions inhibiting or encumbering each other.

It is another object of the present invention to provide the means to transmit the movement of operator controls to the cutter head.

It is another object of the present invention to prevent undesirable mechanical action and/or adverse load from being transmitted back through the system to the controlling mechanisms.

According to one aspect of the present invention there is disclosed an apparatus for varying height of cutter head on a motor mower vehicle, said apparatus comprising said cutter head having ground contact wheels and being attached to the motor mower vehicle, a lifting means for lifting or lowering the cutter head, said lifting means including a flexible linkage member which is also able to be extended, to enable the cutter head to follow the contours of the ground being traversed and wherein said cutter head is able to be pivoted to the vertical position about a pivotal joint between said cutter head and said motor mower vehicle.

Figure 2:
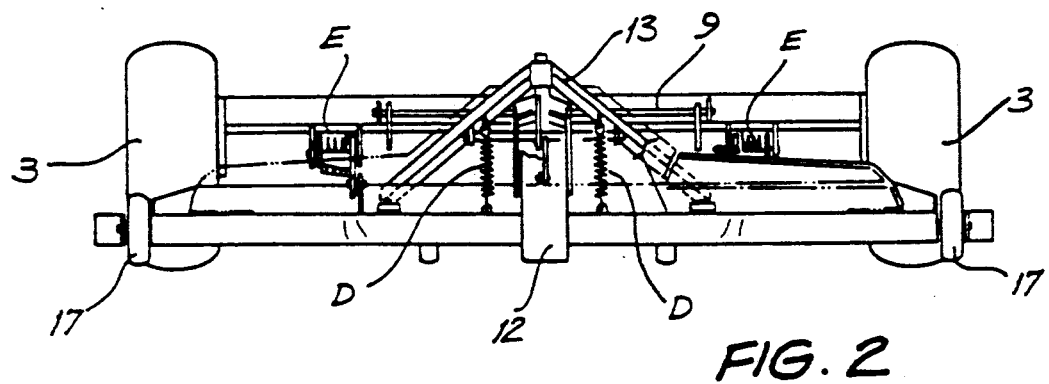
Figure 3:
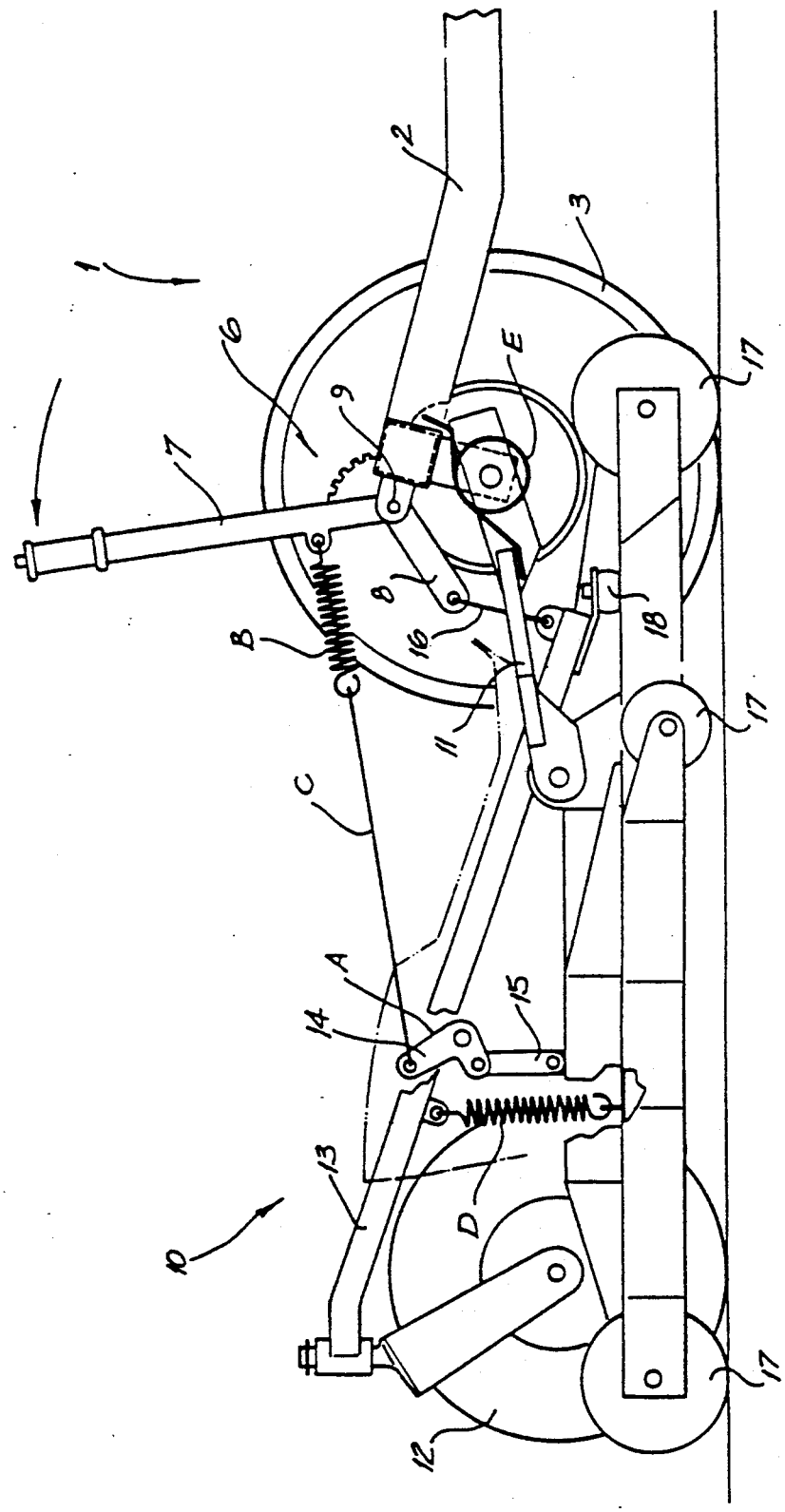
Figure 4:
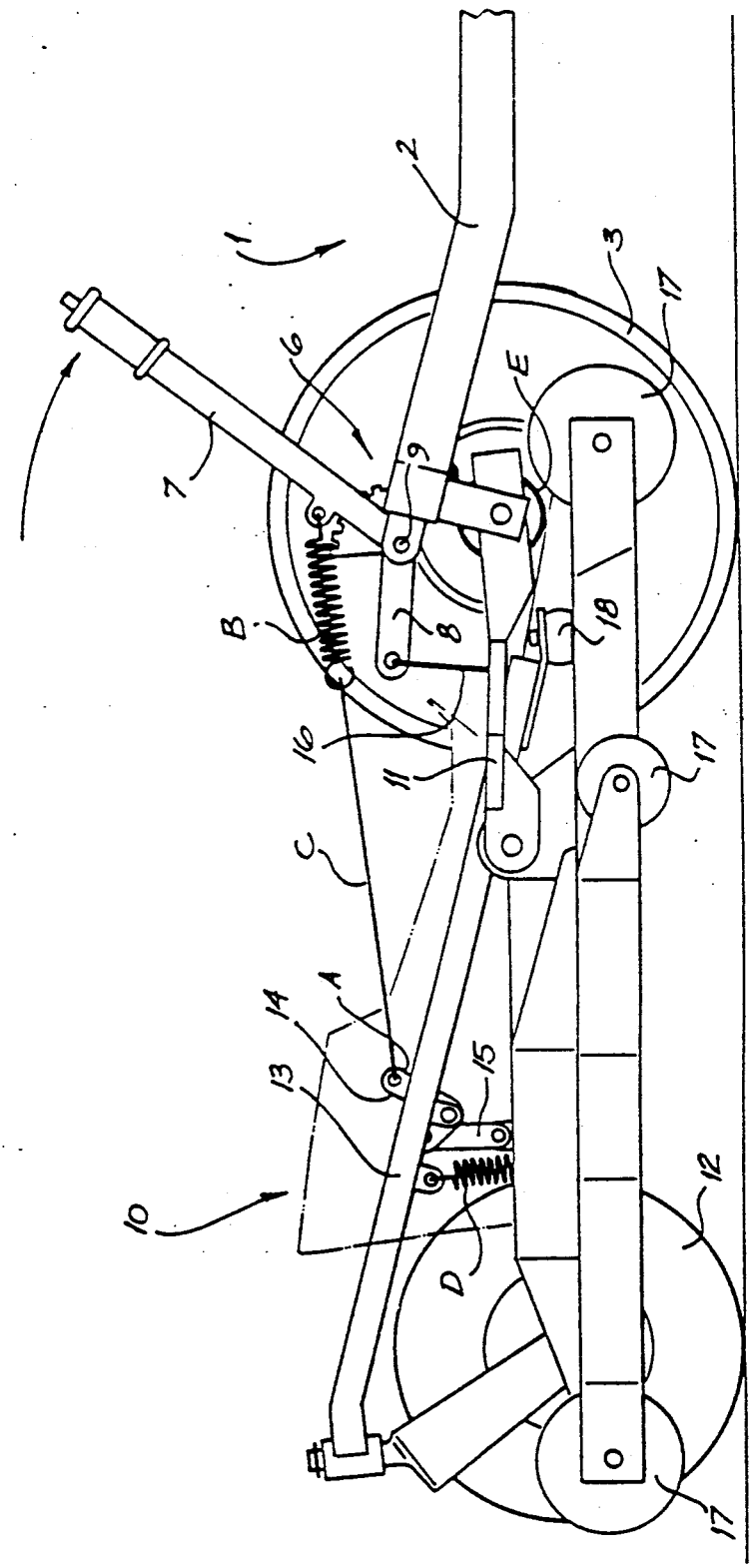
Figure 5:
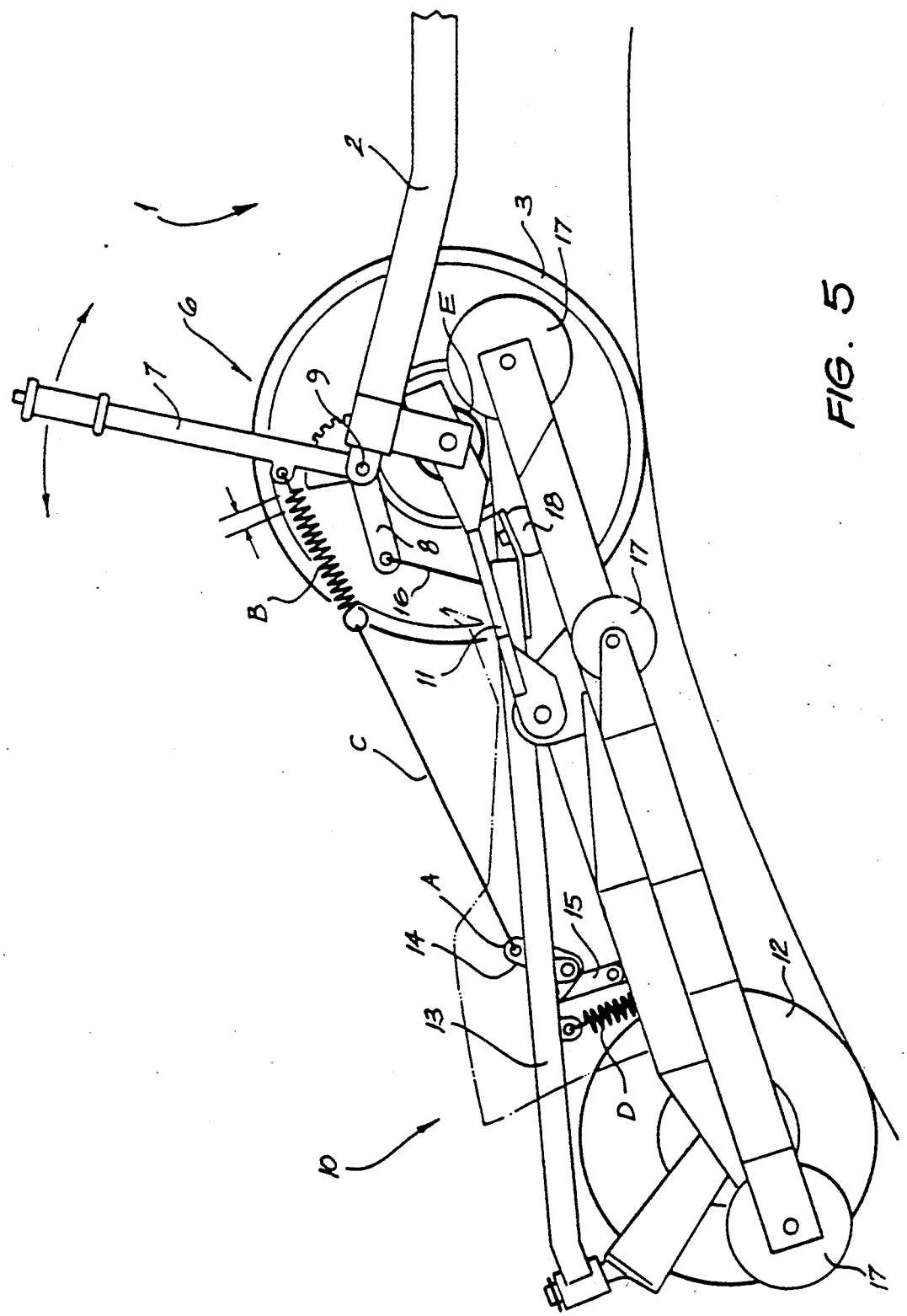
Figure 6:
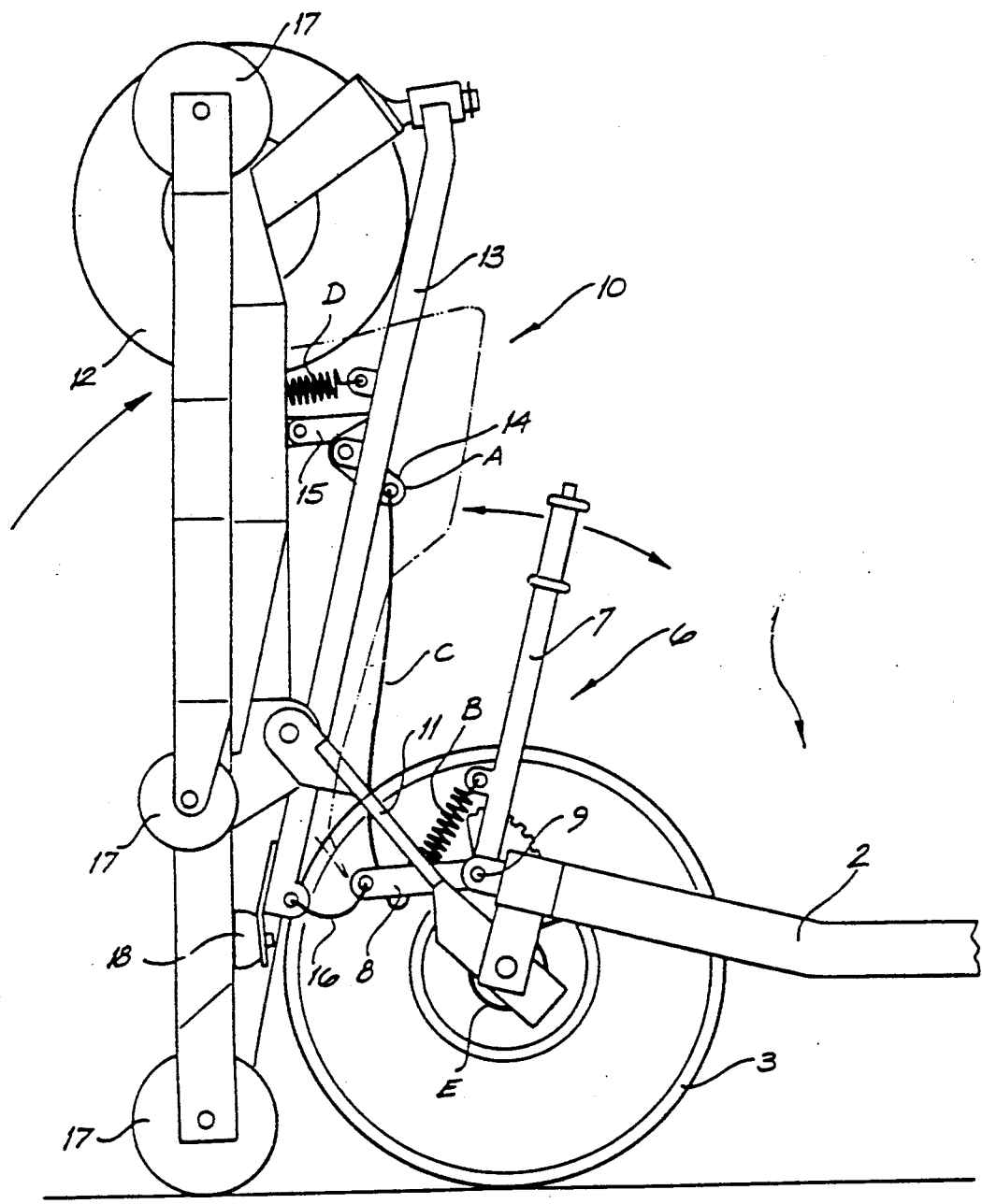

One embodiment of the present invention will now be described with reference to the drawings in which FIG. 1 is a cut away plan view of a front mounted cutter head assembly and tractor vehicle, with the cutter head shown in its rest position, FIG. 2 is a front elevational view of the cutter head assembly and tractor vehicle as shown in FIG. 1, FIG. 3 is a side elevational view of the cutter head and front wheels and cross member of the tractor vehicle shown with minimum cutting height, FIG. 4 is a similar view to FIG. 3 with the cutter head having maximum cutting height, FIG. 5 is a similar view to FIG. 3 with the cutter head having near maximum cutting height shown in an acute dip, and FIG. 6 is a similar view to FIG. 3 shown with the cutter head in a lift up position for maintenance and storage.

The apparatus of the preferred embodiment is applicable to a tractor vehicle 1 having a tractor chassis 2 on which a pair of front wheels 3 and a rear steering/drive wheel 4 are mounted. A body 5 (shown in profile) is attached over the tractor chassis 2.

The apparatus comprises a cutter head 10 which is attached to the chassis 2 by a pair of connecting struts 11. The attachments are made by athwart horizontal pivot pins which allow the cutter head to move reciprocally up and down, allow the cutter head 10 to tilt forward and backwards as well as sideways independent of the chassis 2. The height adjustment of the cutter head 10 is conducted by height adjusting apparatus 6 consisting of an incremental control lever 7 and to lever arms 8 all of which are fixed to a horizontal shaft 9 which is attached to and pivots on the chassis 2.

The components of the embodiment of the present invention which enable the manipulation of the cutter head 10 include a control linkage A comprised of a tension spring B which is joined in series to a flexible wire strop C. The tension spring B is not used as a tension spring in operation but as a mechanical link to transmit movement and to provide protection. The length of the spring B does not extend beyond the contract length during its normal operation unless inexcessive load is applied to the cutter head 10. In affect, the tension spring B is used as an automatic load limiting link. The wire strop C will automatically slacken and/or deflect as required. Other components include a pair of tension springs D and torsion springs E which are used in conjunction with the tension spring B and strop C to manipulate the functions of the cutter head and to determine the maximum load that the tension spring B will be able to accept without extending and therefore determine the physical size and rating according to the particular requirements.

A jockey wheel 12 is attached to a frame 13 by semi-flexible mounts 18. A bell crank 14 is pivoted on the frame 13 and is connected by a solid linkage 15 to the cutter head 10. The strop C is connected to the top of the bell crank 14 and the spring B is connected to the incremental control lever 7. The lever arms 8 are connected by flexible linkages 16 to the cutter head 10. A pair of annex wheels 17 are attached to the cutter head 10 to provide minimum height off the ground.

The tension springs D are connected between the frame 13 and the cutter head 10 to assist the lifting of the front of the cutter head 10. The torsion springs E are positioned on the pivot axis of the pair of connecting struts 11 and the chassis 2 to provide the stored energy to enable the lifting of the rear of the cutter head 10. Torsion springs of the type used in torsion springs E are most suited where the system of connecting the cutter head 10 to the front of the tractor vehicle 1 is employed. It is obvious that other mounting arrangements and configurations could use different type of springs to achieve the same result.

In operation, when changing the height of the cutter head 10, the incremental control lever 7 when moved in a rear wards direction causes the lever arm 8 and linkages 16 to lift the rear of the cutter head 10 whilst simultaneously the control lever 7 operates linkage A which includes the tension springs B and the flexible wire strop C which in turn pivots the bell crank 14 which thereby via the linkage 15 lifts the front of the cutter head 10. The mechanical lifting action transferred from the incremental control lever 7 to the cutter head is assisted by the springs D and E which transfer the majority of the weight of the cutter head 10 to the frame 13 and chassis 2 respectively.

The tension springs D and torsion springs E are preferably of an appropriate physical size and strength to support at least 70% of the weight of the cutter head 10 at all its various height settings but no more than 90% at the lowest height setting. This allows the cutter head 10 to float lightly across the ground on any or all of its annex wheels 17, as and where required, without being significantly influenced by the action of the jockey wheel 12 or the front wheels 3 or rear wheel 4 of the tractor vehicle 1 as it drives over the ground. This means that the cutter head 10 seems to float across the ground independent of the contours of the ground.

The maximum "apparent" weight of the cutter head 10 is the physical weight of the cutter head 10 less the lifting affect of the tension springs D and torsion springs E at the maximum cutting height setting. The maximum "apparent" weight of the front of the cutter head 10 is transmitted via the bell crank 14 and strop C to the spring B and the resultant load on spring B precisely determines the minimum tension load that spring B is required to accept without extending from its fully contracted length. Any load exceeding that by a minimum of 10 to 30% would cause the spring B to extend more than its fully contracted length.

The spring B will extend by an appropriate amount when the jockey wheel 12 and/or the front of the cutter head 10 dips below the attitude of the tractor vehicle as seen in FIG. 5. The "dip down" and degree thereof would be caused by traverse in any appropriate undulation in the surface of the ground.

The amount of extension of the spring B is determined by the cutting height of the cutter head as set by the incremental control lever 7 and/or the acuteness of the angle of the "dip down".

As illustrated in FIG. 5, the cutter head 10 is shown at the maximum height setting and in an acute "dip down" attitude. If in the example shown in FIG. 5, the spring B had been substituted by a solid or non-extending link, then the cutting height adjustment mechanism would attempt the support the cutter head 10 assembly as a cantilever off the front of the tractor vehicle 1 thereby preventing the front of the cutter head 10 from dipping down as it should. The cantilever affect would place a high load on the height adjusting apparatus 6 causing damage thereto. The "dip down" attitude of the cutter head 10 is limited to 20° for safety purposes by the struts 11 which are stopped during the pivoting motion against the chassis 2.

Should a person stand on the front of the cutter head 10 when it is raised above the minimum height, the spring B would extend and the front of the cutter head 10 would dip down until the annex wheels 17 touch the ground. The spring B would extend in proportion to the cutter height setting and protect the height control apparatus from damage. The spring B would fully retract and return the cutter head 10 to the pre-set height when the person steps off the cutter head 10. The strop C in operation will only go slack when various combination of circumstances exist. Two such set of circumstances would be when the front of the cutter head 10 and the jockey wheel 12 rise on an acute hump or inclined of the ground or when the jockey wheel 12 drops into a hole or acute hollow on the ground causing the cutter head 10 to ride on it's front annex wheel 17. The strop C will also go slack when the operator has the cutter 10 set at or near the minimum cutting height.

The distance between the top of the bell cranks 14 and the control lever 7 reduces and the strop C slackens so as not to cause interference with any of the desired functions or to produce an undesirable mechanical action.

With regard to the above examples, if the linkage A is substituted by a solid linkage, an undesirable rearward action would be transmitted to the control lever 7 pushing it to a higher and undesirable height setting. Should this action attempt the push the height control lever 7 beyond its maximum travel, damage would result or the desired functins would not be able to occur.

The circumstances of the examples given above in relation to spring B and the strop C occur frequently and usually alternately. It is intended that the functions of the spring B and the strop C which occur in the above and other examples are able to interact with each other, particularly when mowing or cutting the grass angularly across spoon drains, water causes and other common obstacles.

Because the linkage A is flexible and can slacken and deflect, the operator may manually lift the front of the cutter head and stand it in a vertical position to perform maintenance easily. This is clearly illustrated in FIG. 6 where the cutter head 10 is at a vertical arrangement.

It has been seen in practice that the springs B, strop C and springs D and E in combination and when connected to the other apparatus fulfill all the purposes and allow the performance of all the functions as described previously. It has also been seen in practice that when any one of the springs B, strop C and springs D and E are removed and, with the exception of springs D and E replaced with more conventional solid linkages, none of the purposes are fulfilled nor are any of the functions performed to a satisfactory standard.

The foregoing describes only one embodiment of the present invention, and modifications obvious to those skilled in the art can be made thereto without departing from the scope of the present invention.

What I claim is:

1. An apparatus for varying height of cutter head on a motor mower vehicle, said apparatus comprising said cutter head having ground contact wheels and being attached to the motor mower vehicle, a lifting means for lifting or lowering the cutter head, said lifting means including a flexible linkage member which is also able to be extended, to enable the cutter head to follow the contours of the ground being traversed and wherein said cutter head is able to be pivoted to the vertical position about a pivotal joint between said cutter head and said motor mower vehicle.

2. Apparatus as claimed in claim 1 wherein said cutter head is pivotally connectable to said vehicle by means of a pair of struts with pivot means whereby the cutter head is able to move reciprocally up and down, tilt forwardly and rearwardly and to tilt laterally independently of the chassis.

3. Apparatus as claimed in claim 2 wherein said lifting means further includes bell crank means which in cooperation with the flexible linkage member are operable by a height adjusting mechanism to vary the height of said cutter head.

4. Apparatus as claimed in claim 3 wherein said lifting means further includes spring means attached to said cutter head to assist in the lifting of said cutter head.

5. Apparatus as claimed in claim 4 wherein said cutter head is connected to a frame which has at least one jockey wheel attached thereto.

6. Apparatus as claimed in claim 5 wherein said cutter head has at least one annex wheel to provide minimum height of the cutter head to the ground.

7. Apparatus as claimed in claim 6 wherein said height adjusting mechanism is manually adjusted by means of a lever.

* * * * *